US007063258B1

(12) United States Patent
Karolewicz

(10) Patent No.: US 7,063,258 B1
(45) Date of Patent: Jun. 20, 2006

(54) MAGNETICALLY AFFIXABLE BULK MAIL CARD AND ASSOCIATED MANUFACTURING METHOD

(76) Inventor: Dan Karolewicz, 490 S. Mill View Way, Ponte Vedra Beach, FL (US) 32082

( * ) Notice: Subject to any disclaimer, the term of this patent is extended or adjusted under 35 U.S.C. 154(b) by 0 days.

(21) Appl. No.: 11/124,481

(22) Filed: May 9, 2005

(51) Int. Cl.
*G06K 7/08* (2006.01)

(52) U.S. Cl. .................................................... 235/449

(58) Field of Classification Search ................ 235/449
See application file for complete search history.

(56) References Cited

U.S. PATENT DOCUMENTS 5,284,365 A * 2/1994 Stuart ......................... 283/117
5,458,282 A 10/1995 Martin
5,836,038 A * 11/1998 Thorp ....................... 15/209.1
6,153,279 A 11/2000 Charley
6,153,280 A * 11/2000 Uffmann ...................... 428/43
6,273,660 B1 8/2001 Ozgen et al.
6,428,869 B1 8/2002 Ozgen et al.
6,431,513 B1 * 8/2002 Rosen ..................... 248/309.4
6,472,037 B1 10/2002 Kane
6,718,673 B1 4/2004 Ray, III et al.
2003/0077465 A1 4/2003 Boudouris et al.
2003/0165652 A1 9/2003 Rivera et al.
2004/0166275 A1 * 8/2004 Martin ...................... 428/40.1

* cited by examiner

*Primary Examiner*—Karl D. Frech
*Assistant Examiner*—Tae W. Kim

(57) ABSTRACT

An apparatus includes a body that has monolithically formed top and bottom surfaces and opposed top and bottom edge portions respectively. An annular magnetic member is directly affixed to one of the top and bottom surfaces and is positioned adjacent to one of the top and bottom edge portions. The annular magnetic member is sufficiently sized and shaped for affixing the body against a support surface elevated from a ground surface. The annular magnetic member has a smooth and arcuate outer perimeter which effectively resists premature peeling and fraying during manufacturing processes. The annular magnetic member and the body further have substantially equal thicknesses for occupying minimum interior space defined within a postal envelope.

3 Claims, 3 Drawing Sheets

MAGNETICALLY AFFIXABLE BULK MAIL CARD AND ASSOCIATED MANUFACTURING METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to cards such as post cards, greeting cards, advertising cards, pocket cards and the like, and, more particularly, to such cards having a magnetic material for removably attaching the card to a magnetic surface for display and associated method of use.

2. Prior Art

Magnetic labels are well known in the art and generally include advertising material printed on one side of label stock and a magnet permanently adhered to the other side. In use, magnetic labels are generally placed onto a metallic object and may serve the dual purpose of advertising a product, and securing paper and other such material underneath the magnetic label. Thus far, the usage potential of magnetic labels has been limited, in that the magnetic label typically requires a separate means of delivery to a customer than the advertised product itself. Moreover, if the magnetic label is affixed to an advertised product, removal of the label from the product in turn damages the product label itself, or may contaminate the product contents.

In the past, magnetic labels were generally manufactured by permanently adhering printed material onto a magnet and thereafter cutting the magnets to a desired size or shape. The conventional manufacturing methods of the past have had limited potential, in that once the magnetic labels have been cut, a seller generally has to separately distribute the magnetic label with each product. For products manufactured by the thousands or millions, such distribution requirements can significantly increase the overall cost of the product.

An alternative to the use of magnets alone is the combination of a magnet and a card, such as a post card, business card etc. Advertisers are always seeking innovative ways to distinguish themselves from other providers of competing goods and services. One way for a vendor to distinguish itself and its products or services is to distribute magnetic information cards which its consumers may place in a convenient and conspicuous location, such as, for example, a refrigerator, where the information is readily accessible and unlikely to be lost. From business cards and advertising cards to novel postcards and greeting cards, magnet cards are growing in popularity. The current construction of magnetic cards, however, has several disadvantages.

A conventional magnetic card typically comprises a flexible card blank to which a flexible magnetic sheet material is attached. The combination of the card blank and magnetic material forms a magnet panel with a magnetic face and a card face that may contain text and graphics. The card blank may be printed with text and graphics in any manner desired, with a special message or graphic on the card face of the magnet panel. When mounted on a magnetic receptive surface, the information contained on the card face of the magnet panel is conveniently displayed. Unfortunately, the advertising section of the magnetic card is not easily separable from the magnetic section. Furthermore, the magnetic sheets used in production of such magnetic cards are bulky and inconvenient for mailing purposes. Such magnetic sheets, although less expensive than a solo magnet advertisement, are still rather expensive to produce in bulk.

U.S. Pat. No. 5,641,116, to Martin discloses a similar product that employs a rectangular shaped magnetic strip. A shortcoming of Martin's magnetic strip is its higher production cost and higher mass, which weighs down the blank and, therefore, results in higher postage costs. It is noted the broadest claim in the Martin patent was reexamined at the U.S. Patent and Trademark Office and was subsequently narrowed in scope. Applicant notes the narrowed scope of Martin's patent protection is material to support the non-obvious size and shape of the present invention's annular magnetic member, described hereinbelow.

Accordingly, a need remains for a novel magnetically affixable card and associated method in order to overcome the above-noted shortcomings. The present invention satisfies such a need by providing a magnetically affixable card that is easy to use and produce, provides money savings to the consumer and the advertiser, and is versatile in its applications. The small size of the magnet greatly reduces production costs, and thus, advertising costs, and does not pose a threat to mail processing centers where conventional magnets may cause damage to the machinery, due to being their thickness. The attached card can be perforated such that pertinent information can easily be separated from the magnet and be kept on hand by the consumer. Such a magnetically affixable card finds appeal with various business establishments, as well organizations such as schools, commercial establishments, and many others.

BRIEF SUMMARY OF THE INVENTION

In view of the foregoing background, it is therefore an object of the present invention to provide a magnetically affixable card and associated method. These and other objects, features, and advantages of the invention are provided by an apparatus including a body that has monolithically formed top and bottom surfaces and opposed top and bottom edge portions respectively. In an alternate embodiment, such a body may include at least one perforation formed therein for defining a line of weakness along which at least one portion of the body is conveniently separable from a remaining portion of the body.

An annular magnetic member is conveniently directly affixed to one of the top and bottom surfaces, and is positioned adjacent to one of the top and bottom edge portions. Such an annular magnetic member preferably has a diameter less than 2 inches for minimizing a total weight of the apparatus and minimizing postal charges associated with the weight when the apparatus is mass mailed through the postal service.

The annular magnetic member is sufficiently sized and shaped for conveniently affixing the body against a support surface elevated from a ground surface. Such an annular magnetic member has a smooth and arcuate outer perimeter which advantageously effectively resists premature peeling and fraying during manufacturing processes. The annular magnetic member and the body further have substantially equal thicknesses for advantageously occupying minimum interior space defined within a postal envelope. The annular magnetic member preferably includes a magnetic core and a non-magnetic layer coated over the magnetic core for advantageously and effectively protecting the magnetic core from directly contacting undesirable foreign debris.

A method of producing the apparatus includes the steps of providing a body that has monolithically formed top and bottom surfaces and opposed top and bottom edge portions respectively. Alternately, the body may be produced to include at least one perforation formed therein for defining a line of weakness along which at least one portion of the body is conveniently separable from a remaining portion of the body.

A further step includes affixing an annular magnetic member directly to one of the top or bottom surfaces and positioning same adjacent to one of the top or bottom edge portions. The annular magnetic member preferably includes a magnetic core and a non-magnetic layer coated over the magnetic core for advantageously protecting the magnetic core from directly contacting undesirable foreign debris.

The annular magnetic member is sufficiently sized and shaped, during production, for affixing the body against a support surface elevated from a ground surface. Such an annular magnetic member is produced with a smooth and arcuate outer perimeter which advantageously and effectively resists premature peeling and fraying during manufacturing processes. The annular magnetic member preferably has a diameter less than 2 inches for minimizing a total weight of the apparatus and minimizing postal charges associated with the weight when the apparatus is mass mailed through the postal service.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 2:
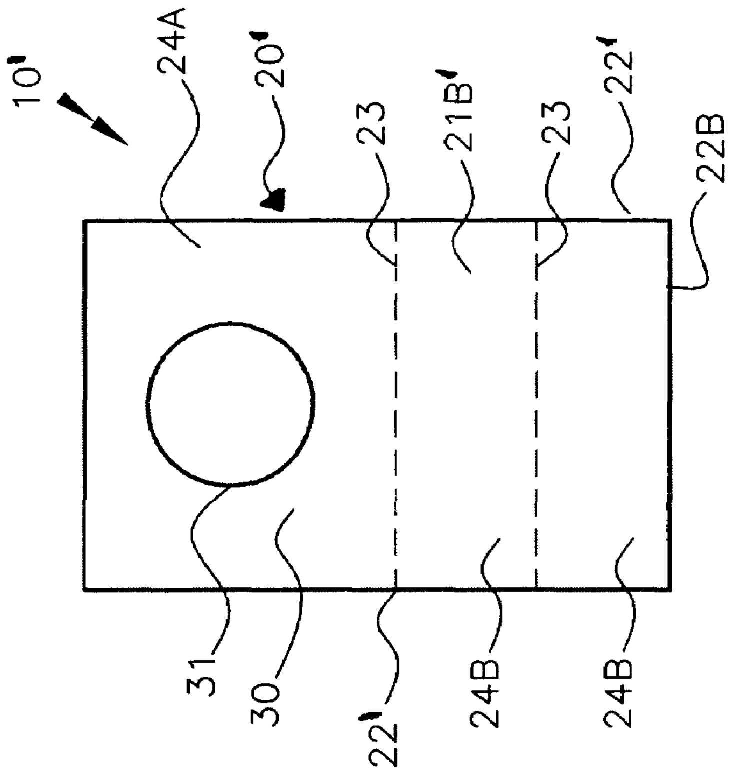
FIG. 2 is a rear-elevational view showing an alternate embodiment of the apparatus shown in FIG. 1, showing the line of perforation.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime number refer to alternate embodiments of such elements.

The apparatus of this invention is referred to generally in FIGS. 1–5 by the reference numeral 10 and is intended to provide a magnetically affixable card and associated method. It should be understood that the apparatus 10 may be used to affix magnets to many different types of cards and should not be limited in use to only business advertisements.

Figure 1:
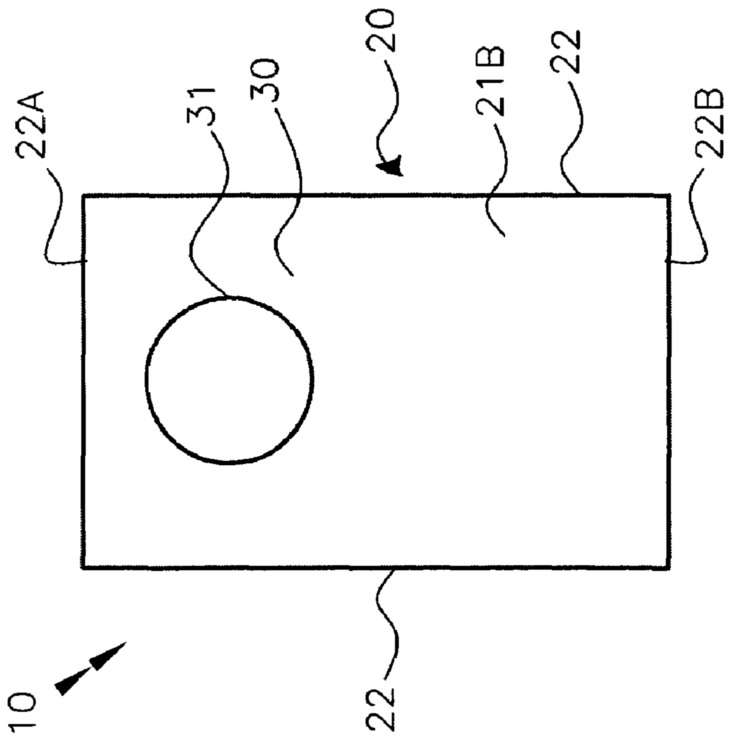
FIG. 1 is a rear-elevational view showing a magnetically affixable card, in accordance with the present invention.
Figure 3:
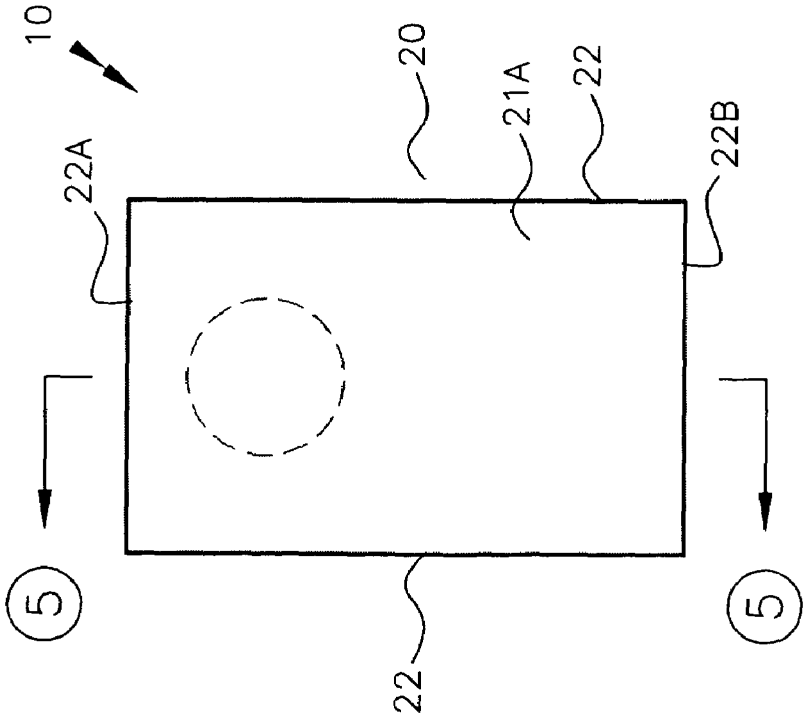
FIG. 3 is a front-elevational view of the apparatus shown in FIG. 1.
Figure 5:
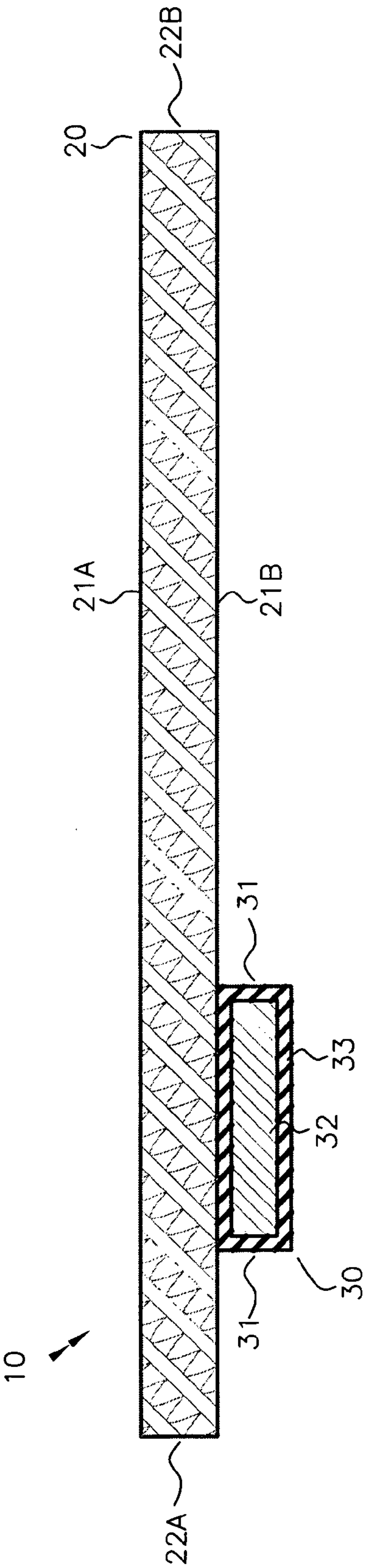
FIG. 5 is an enlarged cross-sectional view of the apparatus shown in FIG. 3, taken along line 5—5 and showing the substantially equal thickness of the magnetic member and the body.

Referring initially to FIGS. 1, 3 and 5, the apparatus 10 includes a body 20 that has monolithically formed top 21A and bottom 21B surfaces and opposed top 22A and bottom 22B edge portions respectively. Of course, the top 21A and bottom 21B surfaces of the body 20 may be provided with surface indicia (not shown) for various advertising and other information sharing purposes, as is obvious to a person of ordinary skill in the art.

Figure 4:
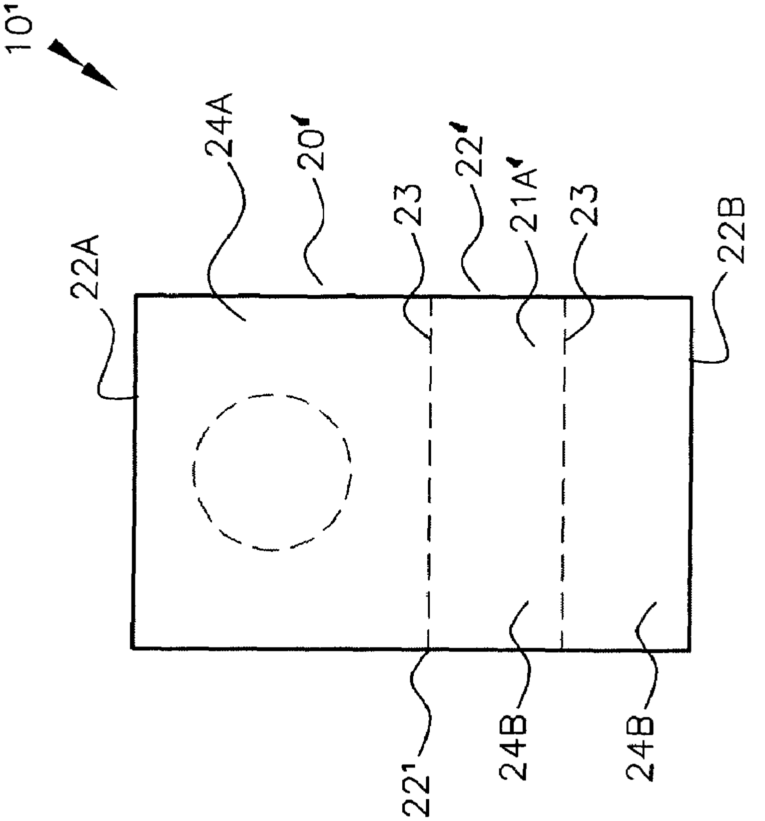
FIG. 4 is a front-elevational view of the apparatus shown in FIG. 2.

Referring to FIGS. 2 and 4, in an alternate embodiment 10', such a body 20' includes at least one perforation 23 formed therein for defining a line of weakness along which at least one portion 24B of the body 20' is conveniently separable from a remaining portion 24A of the body 20'. Such an embodiment greatly increases the versatility of the apparatus 10'. For example, the perforation 23 allows an advertiser to display their general information on the remaining portion 24A while the one portion 24B may be produced to represent a business card or coupon that can conveniently be separated from the body 20 and carried with the consumer, as is obvious to a person of ordinary skill in the art. Of course, the apparatus 10 may be produced to have more than one perforation 23 per body 20, as is obvious to persons of ordinary skill in the art.

Referring to FIGS. 1, 2, and 5, an annular magnetic member 30 is conveniently directly affixed, with no intervening elements, to one of the top 21A or bottom 21B surfaces, and is positioned adjacent to one of the top 22A or bottom 22B edge portions. It is noted the annular shape of the magnetic member 30 is critical for reasons stated hereinbelow. Such an annular magnetic member 30 has a diameter less than 2 inches which is preferred for minimizing a total weight of the apparatus and minimizing postal charges associated with the weight when the apparatus 10 is mass mailed through the postal service. In research trials, the annular magnetic member 30 has been shown to be 250% more cost-effective than comparable applications of knowledge in the prior art. Thus, the advertiser saves a considerable amount of money, which in turn results in a reduced cost of goods and services to the consumer.

Still referring to FIGS. 1, 2 and 5, the annular magnetic member 30 is sufficiently sized and shaped for conveniently affixing the body 20 against a magnetic support surface elevated from a ground surface. Such an annular magnetic member 30 has a smooth and arcuate outer perimeter 31 which is important for advantageously and effectively resisting premature peeling and fraying during manufacturing processes. Such reduced fraying and premature peeling further reduces the production costs of the apparatus 10, while also allowing same to remain suspended on a support surface for longer periods of time than conventional magnetic members, respectively.

The annular magnetic member 30 and the body 20 further have substantially equal thicknesses which are critical and advantageous for occupying minimum interior space defined within a postal envelope. The minimal combined thickness of the magnetic member 30 and the body 20 (less than 3–4 mm) does not interfere with bulk mail sorting equipment employed by the U.S. Postal Service, such that the apparatus 10 can advantageously be mailed at any level of mailing service, whether it be first class mail or standard mail. Of course, the apparatus 10 may be mailed in a solo format, without the use of an envelope, as well, as is obvious to a person of ordinary skill in the art.

Referring to FIG. 5, the annular magnetic member 30 includes a magnetic core 32 and a non-magnetic layer 33 coated over the magnetic core 32 that is essential and advantageous for effectively protecting the magnetic core 32 from directly contacting undesirable foreign debris, which could otherwise alter its magnetic capabilities. Such a magnetic core 32 is essential for effectively enabling the apparatus 10 to be suspended from magnetic surfaces above a ground surface, so as to be more conspicuous.

A method of producing the apparatus 10 includes the steps of providing a body 20 that has monolithically formed top 21A and bottom 21B surfaces and opposed top 22A and bottom 22B edge portions respectively. Alternately, the body 20' is produced to include at least one perforation 23' formed therein for defining a line of weakness along which at least one portion 24B of the body 20' is conveniently separable from a remaining portion 24A of the body 20'. In operation, a larger sheet of paper is printed on in an automated fashion, with up to 6 colors, by printing presses commonly used in the industry. Such a printing press is also capable of perforating the paper, if so required. The larger sheet of paper is then cut down to a size defining the actual body size 20 of the apparatus 10 using a guillotine cutter well known in the industry.

A further step includes affixing an annular magnetic member 30 directly, with no intervening elements, to one of the top 21A or bottom 21B surfaces and positioning same adjacent to one of the top 22A or bottom 22B edge portions. Such an annular magnetic member 30 includes a magnetic core 32 and a non-magnetic layer 33 coated over the magnetic core 32 for advantageously protecting the magnetic core 32 from directly contacting undesirable foreign debris. A plurality of magnetic members 30 may commercially be produced on a tear resistant roll by "Magnum Magnetic" that is effectively used in conjunction with the commercially available and slightly modified "Tab-master", produced by Kirk-Ruby, Inc., for applying such magnetic members 30 onto the pre-printed bodies 20.

The annular magnetic member 30 is sufficiently sized and shaped, during production, for affixing the body 20 against a support surface elevated from a ground surface. Such an annular magnetic member 33 is produced with a smooth and arcuate outer perimeter 31 which advantageously and effectively resists premature peeling and fraying during manufacturing processes. The annular shape of the magnetic members 30 also has a reduced tendency to become loosened from the body 20 upon bending of the body 20, which is a common problem encountered with the conventional rectangular magnetic members that are similarly employed.

Upon completion of the production process, a plurality of apparatuses 10 are recommended to be packaged on one of their edges 22 and not flat, which is critical and advantageous for reducing curling of the body 20. The annular magnetic member 30 further has a diameter less than 2 inches for minimizing a total weight of the apparatus 10 and for minimizing postal charges associated with the weight when the apparatus 10 is mass mailed through the postal service.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. An apparatus comprising: a body having monolithically formed top and bottom surfaces and opposed top and bottom edge portions respectively; and an annular magnetic member directly affixed to one said top and bottom surfaces, said annular magnetic member being positioned adjacent to one said top and bottom edge portions; wherein said annular magnetic member is sufficiently sized and shaped for affixing said body against a support surface elevated from a ground surface, said annular magnetic member having a smooth and arcuate outer perimeter which effectively resists premature peeling and fraying during manufacturing process; wherein said annular magnetic member and said body further have equal thicknesses for occupying minimum interior space defined within a postal envelope, wherein said annular magnetic member has a unitary and solid shape with smooth top and bottom surfaces; wherein said annular magnetic member comprises a magnetic core, and a non-magnetic layer coated over said magnetic core for protecting said magnetic core form directly contacting undesirable foreign debris.

2. The apparatus of claim 1, wherein said annular magnetic member has a diameter less than 2 inches for minimizing a total weight of said apparatus and minimizing postal charges associated with the weight when said apparatus is mass mailed through the postal service.

3. The apparatus of claim 1, wherein said body includes at least one perforation formed therein for defining a line of weakness along which at least one portion of said body is separable from a remaining portion of said body.

* * * * *